United States Patent [19]

Ellwanger

[11] 4,115,340
[45] Sep. 19, 1978

[54] INVERSION OF WATER-IN-OIL EMULSIONS OF POLYACRYLAMIDE IN HARD WATER

[75] Inventor: Richard Earl Ellwanger, Tucson, Ariz.

[73] Assignee: American Cyanamid Company, Stamford, Conn.

[21] Appl. No.: 795,993

[22] Filed: May 11, 1977

[51] Int. Cl.$^2$ ................................................ C08F 6/14
[52] U.S. Cl. .................... 260/29.6 HN; 260/29.6 WQ
[58] Field of Search ............... 260/29.6 WQ, 29.6 HN

[56] References Cited

U.S. PATENT DOCUMENTS

| 3,278,506 | 10/1966 | Chamot et al. ............... 260/29.6 HN |
| 3,284,393 | 11/1966 | Vanderhoff et al. ......... 260/29.6 HN |
| 3,624,019 | 11/1971 | Anderson et al. ............ 260/29.6 HN |

OTHER PUBLICATIONS

Emulsions: Theory and Practice, by Becker, 1965, pp. 166–171 and 182–186, Rheinhold Publ. Corp., N.Y.

Primary Examiner—Eugene C. Rzucidlo
Attorney, Agent, or Firm—William J. van Loo

[57] ABSTRACT

Anionic water-in-oil emulsions of polyacrylamide are readily inverted in hard water for dissolution of the polymer therein by effecting inversion at a dilution such that insufficient hardness is present to cause emulsion breaking.

6 Claims, No Drawings

INVERSION OF WATER-IN-OIL EMULSIONS OF POLYACRYLAMIDE IN HARD WATER

This invention relates to a process for inverting a water-in-oil emulsion. More particularly, this invention relates to such a process wherein an anionic water-in-oil emulsion of a polyacrylamide is inverted in hard water without breaking said emulsion.

Polyacrylamides of high molecular weight are water-soluble polymers that have numerous uses in dilute aqueous solution. Such polymers are readily obtained by solution polymerization in water. However, the polymer product obtained at useful concentrations for solution polymerization is in the form of a gel that is difficult to handle for use in its various applications. Usually the polymer is separated from the aqueous medium, such as by drying, to provide a dry product. Although the dried polyacrylamide is water-soluble, preparation of dilute solutions for use is tedious and time-consuming because it requires controlled addition of small quantities of powdered polymer to strongly agitated water and extensive time to complete dissolution.

To avoid the problems that arise from solution polymerization of acrylamide, the recent trend has been to prepare the polyacrylamide in the form of a water-in-oil emulsion with the polymer being present in the dispersed aqueous phase. In such preparation, acrylamide is dissolved in a suitable quantity of water, mixed with a suitable oil and water-in-oil type emulsifier, and converted to a water-in-oil emulsion which is then subjected to polymerization conditions to provide a high molecular weight polyacrylamide in the dispersed aqueous phase. Generally, the water-in-oil emulsion contains about 25 weight percent of polymer in its composition.

When acrylamide is polymerized in aqueous solution, its solution viscosity is extremely high even at polymer concentrations as low as about 0.5% and this high solution viscosity causes problems in attempting to use the polymer in many of its desirable applications. The basic purpose of providing the polymer in the form of a water-in-oil emulsion is to avoid the problems created by the high solution viscosity of the polymer. The polymer obtained by emulsion polymerization has a comparable molecular weight to similar polymers prepared by solution polymerization. However, since the polymer is present in the dispersed phase of a water-in-oil emulsion, no problems of solution viscosity arise while the polymer is in such form.

In the current procedure of use of a water-in-oil emulsion for aqueous applications, the water-in-oil emulsion is diluted with water and is inverted in the presence of a suitable inverting agent, which may be present in the emulsion or added to the dilution water or emulsion upon dilution. After inversion, the emulsion becomes an oil-in-water emulsion with the polymer being released to the continuous aqueous phase wherein it readily dissolves. Since the basic purpose of providing the water-in-oil emulsion of polyacrylamide is to avoid problems that arise because of the high solution viscosity of polyacrylamide at above about 0.5 weight percent polymer, current procedure is to dilute the original water-in-oil emulsion with sufficient of the process water to reduce the polymer content to about 0.1 weight percent or less and to conduct inversion of the thus-diluted emulsion. This procedure has been highly successful in those applications wherein the process water employed is relatively free of hardness.

In preparing the most desirable water-in-oil emulsions of polyacrylamide, it has been found that an anionic agent should preferably be present in at least one of the systems used to provide the emulsion or to achieve inversion thereof. Such choice is generally necessary to achieve emulsification, to provide an emulsion of adequate storage stability, or to effect inversion readily and completely. It has been found, however, that when the current procedure for inverting such water-in-oil emulsion is carried out using process waters that are classified as hard, breaking of the emulsion occurs rather than inversion thereof. When emulsion breaking occurs before inversion can be effected due to water hardness, the amount of dissolved polyacrylamide available in the water to be processed, as by flocculation for example, is less than the amount intended and processing effectiveness diminishes. In uses involving water purification, for example, the quality of the water obtained by processing will be adversely affected by failing to provide the necessary amount of dissolved polyacrylamide.

While it is possible to avoid the problems described with respect to hard waters by use of a water-in-oil emulsion which is free of anionic agents in both the emulsifying and inverting systems, such provision necessitates the provision of a special product for specific uses and requires use of agents that generally do not provide emulsions of good quality, of adequate stability, or of ready and complete inversion. Accordingly, a highly desirable advance in the art would constitute a process of use of the anionic water-in-oil polyacrylamide emulsions which would avoid breaking of the emulsions with hard waters and thus overcome the problem described.

In accordance with the present invention, there is provided a process for inverting anionic water-in-oil emulsion of a polyacrylamide in hard water so as to provide a solution of polyacrylamide in said hard water as the continuous phase, which process comprises diluting said emulsion with a quantity of hard water such that the amount of hardness present is insufficient to break said emulsion, agitating the diluted emulsion to effect inversion thereof to an oil-in-water emulsion, and thereafter diluting the oil-in-water emulsion formed with additional hard water.

The process of the present invention avoids the problems of emulsion breaking that are encountered when anionic water-in-oil emulsions are conventionally employed in applications involving hard waters. As a result, the polymer is readily released to the continuous hard water phase for dissolution therein and the desired performance of the polymer is achieved. The process of the present invention eliminates the need for special emulsifiers and/or inverters for use in hard waters and avoids the problems associated therewith. The process of the present invention enables maximum performance of an anionic water-in-oil emulsion of polyacrylamide to be obtained in hard water.

In carrying out the process of the invention, one starts with a conventional anionic water-in-oil emulsion of a polyacrylamide. By an "anionic water-in-oil emulsion" as that and similar terms are used in the present specification and claims, is meant that the water-in-oil emulsion contains an anionic agent in the emulsification or inversion system or is to be used with an added anionic inversion system. By the expression "polyacrylamide" as that term is used herein is meant a polymer which has a major portion of its repeating units derived from acrylamide. Such a polymer includes homopolymers of acrylamide and methacrylamide as well as copolymers thereof with such monomers as acrylic acid, methacrylic acid, acrylonitrile, methacrylonitrile, vinylimidazoline, vinyl acetate, diallyldimethylammonium chloride, and such other monomers as are conventionally used to provide water-soluble polymers. The molecular weight of the polyacrylamide will generally be at least about 100,000, perferably, at least about 500,000 and more preferably, at least about 1,000,000 and higher. Because acrylamide is a highly reactive monomer, such molecular weight values are routinely obtained.

The water-in-oil emulsion is prepared according to conventional procedures, such as described in U.S. Pat. No. 3,284,393 and U.S. Pat. No. 3,624,019. In such procedure, an organic liquid, such as toluene, is used as an oil phase and acrylamide monomer, or a monomer mixture as defined above, dissolved in water is used as the second phase. The relative proportions of oil to water can vary widely, but preferably is about 1:2 to 1:10. The amount of monomer or monomer mixture may be in a range such that the emulsion will have a polymer content of about 5-75 weight percent, preferably about 10-45 weight percent, and still more preferably about 20-30 weight percent. An emulsifying agent or agents of a type suitable to provide a water-in-oil emulsion is added, preferably to the oil phase, in suitable amount. The oil phase and water phase, with the useful emulsifying agent, are then subjected to suitable mechanical action to provide a stable emulsion. After the emulsion is formed, it is next subjected to polymerization conditions so as to provide polyacrylamide in the dispersed phase. Once the water-in-oil emulsion with its dispersed polyacrylamide content is obtained, it is ready for use but should be of sufficient storage stability to be used when desired. If desired, an inversion agent may be added to the emulsion prior to use or the inversion agent may be subsequently added either to the emulsion or the water at the time inversion is to be conducted.

As indicated, the process of the present invention applied to the use of the anionic polyacrylamide water-in-oil emulsion in hard water as the process water. By "process water" is meant the water that is to undergo treatment with the polyacrylamide. By "hard water" is meant a process water that has a hardness content equivalent to about 100 parts per million as $CaCO_3$ and higher.

In carrying the process of the present invention, the water-in-oil emulsion and the effective amount of inverting agent is first diluted with a quantity of the hard water comprising the process water, the quantity being insufficient to break the water-in-oil emulsion but sufficient to effect inversion to an oil-in-water emulsion. The quantity of hard water to be used may vary depending upon the actual hardness of the water employed and the initial concentration of polymer present in the water-in-oil emulsion to be inverted, but in any event, will be less than the amount of water conventionally employed in inverting the water-in-oil emulsion in soft water. The particular amount of hard water to be used in emulsion inversion can readily be determined by titrating an emulsion sample with the hard water until the inception of emulsion breaking occurs and then using a quantity of hard water in the emulsion inversion that is safely above that quantity that would initiate breaking.

The "dilution ratio" may be defined as the final volume of a diluted emulsion relative to its initial volume. For example, if an initial emulsion of 25% polymer content is to be diluted to 0.1% for conventional emulsion inversion with soft water, the dilution ratio would be 250, meaning that one volume of initial emulsion is diluted with 249 volumes of soft water to provide a total of 250 volumes. Similarly, if an initial emulsion of 10% polymer content is to be diluted to 0.2% for conventional emulsion inversion with soft water, the dilution ratio would be 50, meaning that one volume of initial emulsion is diluted with 49 volumes of soft water to provide a total of 50 volumes.

In carrying out the process of the present invention, it is not necessary to dilute the initial emulsion content to below a polymer content of about 2% to provide effective inversion although lower dilutions may be employed provided emulsion breaking does not occur due to the hardness of the water. Generally, it is found that effective inversion and subsequent dissolution of the polyacrylamide liberated to the continuous aqueous hard water phase can be effected at about half the dilution ratio conventionally employed with soft water, providing the hardness of the dilution water is not too great.

After the initial dilution has been carried out as indicated, the diluted emulsion is subjected to sufficient agitation to effect emulsion inversion and provide an oil-in-water emulsion. There are numerous tests that can be used to determine which is the continuous phase of the emulsion. A simple test is to add one of the two liquid phases to a small portion of the emulsion, if the viscosity increases the added liquid is the disperse phase. Another method is to add an oil soluble dye to a small portion of the emulsion, if the emulsion becomes colored throughout, oil is the continuous phase. Still another test is to stir a drop of the emulsion with water, if it does not mix oil is the continuous phase. After the emulsion has been inverted as indicated, it can now be diluted to use concentration. In the inverted form, the emulsion is an oil-in-water emulsion, the aqueous polymer composition is present in the continuous phase, and subsequent breaking of the emulsion will not interfere with complete dissolution of polymer in the continuous aqueous phase in spite of the fact that further dilution is done with hard water.

The invention is more fully illustrated by the examples which follow wherein all parts and percentages are by weight unless otherwise specified.

EXAMPLE 1

A sample of a water-in-oil emulsion containing 25 weight percent of a polyacrylamide composition of 100 mole percent acrylamide was divided into two parts for inversion with hard water containing 400 ppm $Ca^{+2}$. A first sample was diluted with the hard water to 0.1% polymer solids and inverted. This sample is identified as Comparative A.

The second sample was diluted to 2.0% polymer solids and inverted. The inverted emulsion was then diluted further with the hard water to a polymer solids of 0.1%.

The two samples of inverted and dilute oil-in-water emulsions were then evaluated in settling of suspensions of silica at a dosage of 3 milligrams of polymer. The polymer emulsion inverted in accordance with the present invention provided a settling rate of 0.3154 centimeters per second and Comparative A provided a settling rate of 0.2819 centimeters per second.

EXAMPLE 2

The procedure of Example 1 was again followed except that the dilution contained 800 ppm $Ca^{+2}$. The sample diluted with the hard water to 0.1% polymer solids was identified as Comparative B.

The polymer emulsion inverted in accordance with the present invention provided a settling rate of 0.6433 centimeters per second and Comparative B provided a settling rate of 0.3884 centimeters per second.

The difference in settling rates in these examples is due to differences in the amount of polymer dissolved in the 0.1% inverted emulsion. When the emulsion is inverted at 2% polymer solids, according to the invention, faster settling rates are provided because more polymer is available in solution.

I claim:

1. A process for inverting an anionic water-in-oil emulsion containing from about 5 to 75 weight percent of a polyacrylamide in hard water as the continuous phase of the inverted emulsion, which process comprises diluting said emulsion with a quantity of hard water which is insufficient to break said emulsion but sufficient to effect inversion to an oil-in-water emulsion, agitating the diluted emulsion to effect inversion, and thereafter diluting the oil-in-water emulsion formed with additional hard water.

2. The process of claim 1 wherein said anionic water-in-oil emulsion contains 25 weight percent of polymer prior to dilution.

3. The process of claim 1 wherein said polyacrylamide contains 100 mole percent of repeating units of acrylamide.

4. The process of claim 1 wherein said hard water contains 400 ppm $Ca^{+2}$.

5. The process of claim 1 wherein said hard water contains 800 ppm $Ca^{+2}$.

6. The process of claim 2 wherein said water-in-oil emulsion is diluted to 2 weight percent of polymer for inversion.

* * * * *